United States Patent
Wei

(10) Patent No.: US 11,629,830 B2
(45) Date of Patent: Apr. 18, 2023

(54) PROJECTION LAMP WITH DUAL PROJECTION FUNCTION

(71) Applicant: Jun Wei, Zhejiang (CN)

(72) Inventor: Jun Wei, Zhejiang (CN)

(*) Notice: Subject to any disclaimer, the term of this patent is extended or adjusted under 35 U.S.C. 154(b) by 0 days.

(21) Appl. No.: 17/505,096

(22) Filed: Oct. 19, 2021

(65) Prior Publication Data

US 2022/0099261 A1 Mar. 31, 2022

(30) Foreign Application Priority Data

Oct. 28, 2020 (CN) .......................... 202022438122.2

(51) Int. Cl.
| | |
|---|---|
| *F21S 10/00* | (2006.01) |
| *F21V 17/02* | (2006.01) |
| *F21V 9/40* | (2018.01) |
| *G03B 21/00* | (2006.01) |
| *G03B 23/06* | (2006.01) |
| *G03B 31/06* | (2021.01) |

(52) U.S. Cl.
CPC .............. *F21S 10/007* (2013.01); *F21V 9/40* (2018.02); *F21V 17/02* (2013.01); *G03B 21/001* (2013.01); *G03B 23/06* (2013.01); *G03B 31/06* (2013.01)

(58) Field of Classification Search
CPC .... G03B 21/001; G03B 21/02; G03B 21/132; G03B 21/142; G03B 21/145; G03B 21/208; G03B 21/2033; G03B 23/00; G03B 23/06; G03B 23/08; G03B 23/10; G03B 23/105; G03B 31/02; G03B 31/04; G03B 31/06; G03B 31/08; G03B 31/10; F21S 10/005; F21S 10/007; F21S 10/023; F21S 10/026; F21S 10/066; F21V 9/40; F21V 17/02

See application file for complete search history.

(56) References Cited

U.S. PATENT DOCUMENTS

| | | | | |
|---|---|---|---|---|
| 6,769,778 B1 * | 8/2004 | Lloyd | .................... | G09F 19/18 |
| | | | | 434/285 |
| 10,440,308 B2 * | 10/2019 | Xi | ............................ | F21V 9/08 |
| 10,474,015 B1 * | 11/2019 | Lin | ........................ | F21S 8/035 |
| 2009/0272015 A1 * | 11/2009 | Schnuckle | .............. | G09F 19/16 |
| | | | | 40/299.01 |

(Continued)

FOREIGN PATENT DOCUMENTS

| | | |
|---|---|---|
| CN | 101819376 A | 9/2010 |
| CN | 202442171 U | 9/2012 |

(Continued)

*Primary Examiner* — Sultan Chowdhury

(57) ABSTRACT

A projection lamp with a dual projection function, including a base. The base is provided with a first light-emitting element and a first projection film. Emitted light of the first light-emitting element can pass through the first projection film to be projected outward. The base is provided with a slide projection unit, which includes a light-emitting assembly and a second projection film. Emitted light of the light-emitting assembly can pass through the second projection film to be projected outward. The emitted light of the first light-emitting element passes through the first projection film to be projected outward to form a projection pattern corresponding to the first projection film, and at the same time, the emitted light of the light-emitting assembly passes through the second projection film to form the projection of the slide.

14 Claims, 6 Drawing Sheets

(56) References Cited

U.S. PATENT DOCUMENTS

2012/0008103 A1\* 1/2012 Lalley .................... G03B 37/06
                                                    353/121
2016/0283087 A1\* 9/2016 Nishimura ............... G09G 5/14

FOREIGN PATENT DOCUMENTS

| CN | 206274151 U | 6/2017 |
| CN | 214222969 U | 9/2021 |

\* cited by examiner

PROJECTION LAMP WITH DUAL PROJECTION FUNCTION

CROSS-REFERENCE TO RELATED APPLICATIONS

This application claims the benefit of priority from Chinese Patent Application No. 202022438122. 2, filed on Oct. 28, 2020. The content of the aforementioned application, including any intervening amendments thereto, is incorporated herein by reference in its entirety.

TECHNICAL FIELD

This application relates to projection lamps, and more particularly to a projection lamp with a dual projection function.

BACKGROUND

The projection lamp can provide soft lighting to create a peaceful and romantic atmosphere to make the bedroom comfortable and quiet. For example, Chinese Patent No. 202442171U discloses a multifunctional projection night light, which includes a base, a transparent ring, and a semi-transparent frosted cover. The transparent ring is provided with a projection film with printed patterns, and the light emitted from a luminous body arranged on the base passes through the projection film to be projected onto the semi-transparent frosted cover such that a shadow cast on the semi-transparent frosted cover forms an exquisite pattern. Chinese Patent No. 206274151U also discloses a projection lamp with a superimposed dynamic pattern, which includes a luminous body, a rotating table assembly, a projection film, and a printing film. The light emitted from the luminous body passes through the continuously-rotating projection film to project patterns on the projection film onto the printing film to be superimposed with patterns on the printing film, and the superimposed patterns will constantly change to present a dynamic pattern effect. The projection lamp can produce a sense of beauty and comfort. Nevertheless, the current improvements for the commercially-available projection lamps mainly focus on the pattern and color of the projection film, which is not conducive to the diversification of the projection lamps.

SUMMARY

An object of this application is to provide a novel projection lamp with a dual projection function.

Technical solutions of this application are specifically described as follows.

This application provides a projection lamp with a dual projection function, comprising:

a base;

wherein the base is provided with a first light-emitting element and a first projection film; light emitted from the first light-emitting element is configured to pass through the first projection film to be projected outward; the base is further provided with a slide projection unit; the slide projection unit comprises a light-emitting assembly and a second projection film; and light emitted from the light-emitting assembly is configured to pass through the second projection film to be projected outward.

In an embodiment, the base is further provided with a driving assembly configured to drive the first projection film and/or the second projection film to rotate.

In an embodiment, the first projection film is arranged on a first film mounting seat; the second projection film is arranged on a second film mounting seat; the driving assembly comprises a first motor; and a power output end of the first motor is connected to the first film mounting seat and/or the second film mounting seat through a transmission mechanism.

In an embodiment, the second projection film is arranged on an insertion plate; and the insert plate is detachably inserted into a slot on the base.

In an embodiment, the second projection film is arranged on a second film mounting seat; the second film mounting seat is arranged on the insertion plate and is configured to be inserted into the slot and pulled out of the slot together with the insertion plate; and the base is further provided with a first motor; and the first motor is connected to the second film mounting seat through a transmission mechanism.

In an embodiment, the second film mounting seat is provided with a second driven gear; a second driving gear is arranged on a power output end of the first motor; the insertion plate is provided with a mounting groove; a notch is provided at an edge of the mounting groove; and after the insertion plate is inserted into the slot, an edge of the second driven gear extended protruding from the mounting groove is engaged with the second driving gear.

In an embodiment, the second projection film comprises a plurality of second projection films; the slide projection unit further comprises a film replacing device; and the film replacing device is configured to replace one of the plurality of second projection films on a projection station with another of the plurality of second projection films.

In an embodiment, the plurality of second projection films are arranged on a film pallet; the film replacing device comprises a second motor; and the second motor is configured to drive the film pallet to rotate to allow the plurality of second projection films to move to the projection station in sequence.

In an embodiment, the slide projection unit further comprises a film recognition device configured to recognize one of the plurality of second projection films at the projection station; and the projection lamp further comprises a sound playing unit configured to play a sound corresponding to one of the plurality of second projection films at the projection station.

In an embodiment, the film recognition device comprises a sensing unit and a plurality of labels; the plurality of labels are in one-to-one correspondence to the plurality of second projection films; and when one of the plurality of second projection films moves to the projection station, a label of the plurality of labels corresponding to the second projection film on the projection station relatively moves to a position opposite to the sensing unit.

In an embodiment, the first projection film is arranged on the first film mounting seat; the film pallet is arranged on the second film mounting seat; and a power output end of a first motor is simultaneously connected to the first film mounting seat and the second film mounting seat through a transmission mechanism.

In an embodiment, the light-emitting assembly comprises a second light-emitting element and a lens set arranged between the second light-emitting element and the second projection film.

In an embodiment, the slide projection unit further comprises a focusing device arranged on an outside of the second projection film.

In an embodiment, a translucent cover, an opaque cover, a transparent cover or a hollow cover is provided at an outside of the first projection film.

In an embodiment, the first projection film is provided with a first through hole; the translucent cover is provided with a second through hole; the first through hole and the second through hole are coaxial; and the light emitted from the light-emitting assembly is configured to pass through the first through hole and the second through hole to be projected outward.

In an embodiment, the base is arranged on a bracket, and the base is configured to be rotatable to adjust a projection angle of the slide projection unit.

Compared to the prior art, this application has the following beneficial effects.

Regarding the projection lamp of the present disclosure, the emitted light of the first light-emitting element passes through the first projection film to be projected outward to form a projection pattern corresponding to the first projection film. At the same time, the emitted light of the light-emitting assembly passes through the second projection film to complete the projection of the slide. In this way, the projection lamp of the present disclosure simultaneously has the function of an ordinary projection lamp and a slide projection function. In addition, a focusing device is provided to adjust the projection pattern of the slide, or a plurality of second projection films are provided to switch the slide projection pattern. At the same time, a film recognition device and a sound playing unit are provided to play corresponding music, song or other sounds, rendering the projection lamp of the present disclosure more enjoyable and entertaining.

DETAILED DESCRIPTION OF EMBODIMENTS

Figure 1:
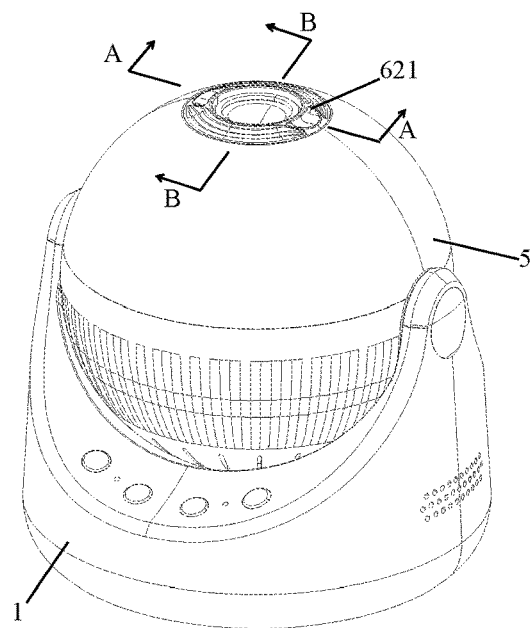
FIG. 1 is a structural diagram of a projection lamp with a dual projection function according to an embodiment of this disclosure.
Figure 2:
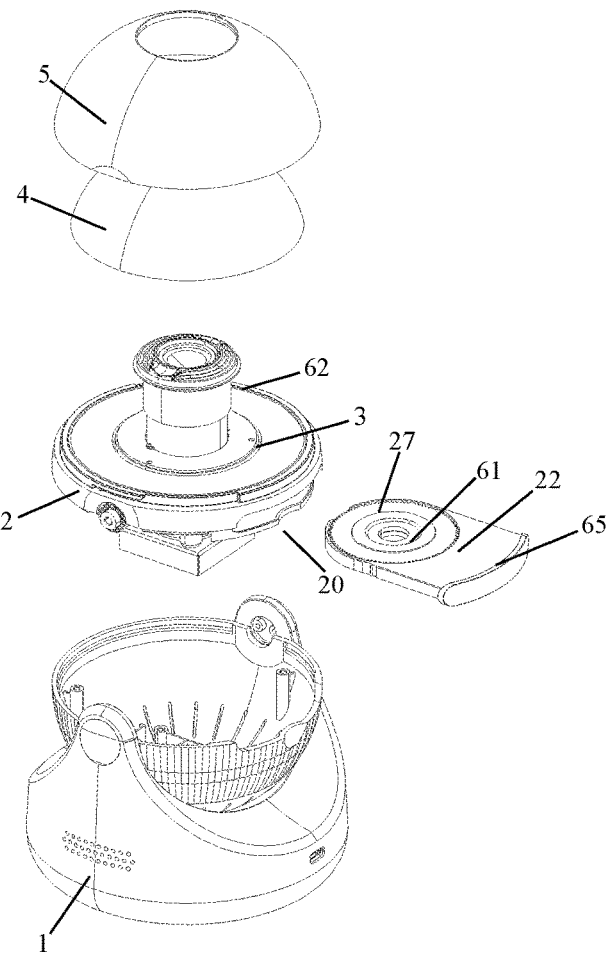
FIG. 2 is an exploded view of the projection lamp in Embodiment 1 of this disclosure.
Figure 3:
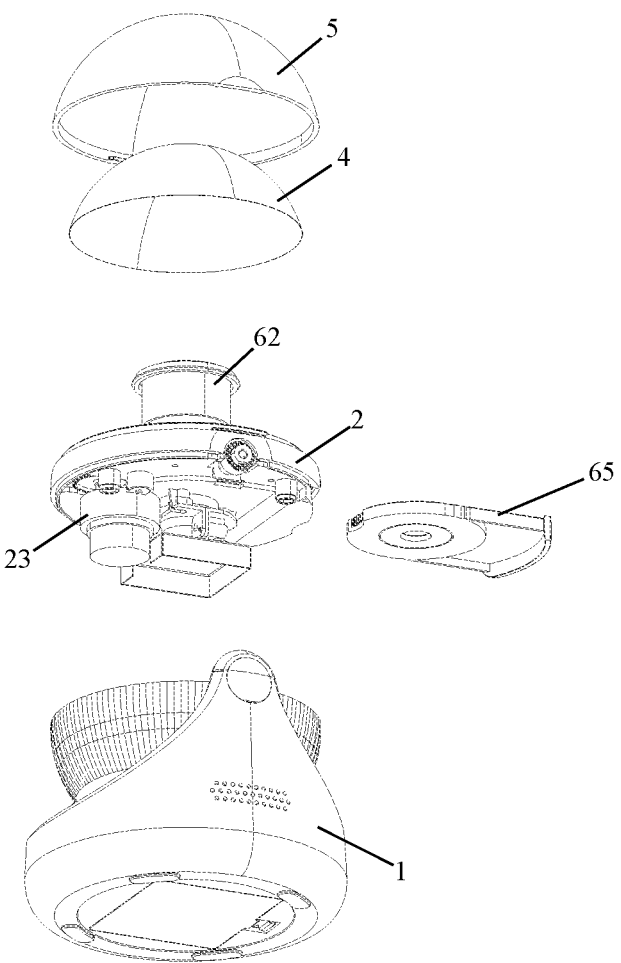
FIG. 3 is an exploded view of the projection lamp in Embodiment 1 of this disclosure from another perspective.
Figure 4:
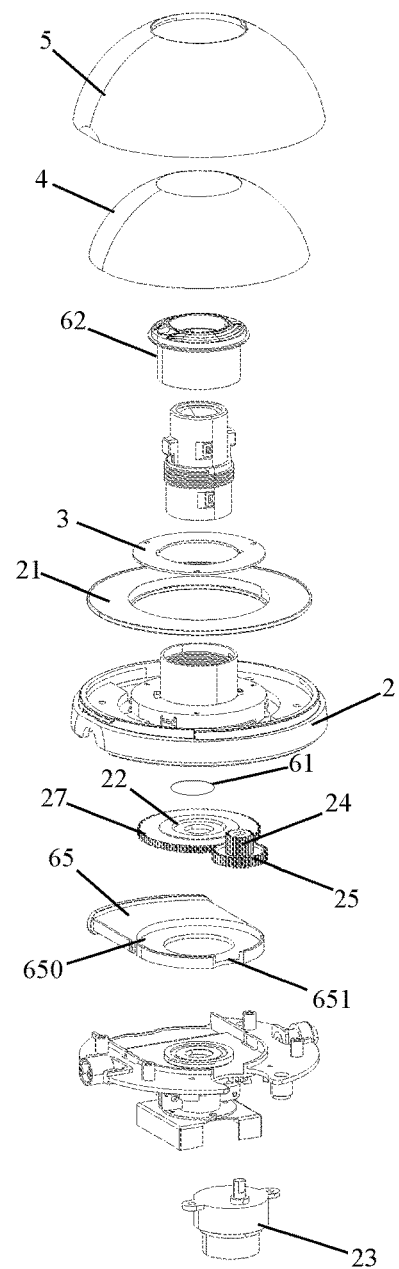
FIG. 4 is an exploded view of the projection lamp in Embodiment 1 of this disclosure in another form.
Figure 4:
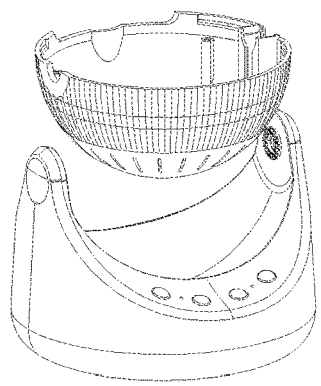
Figure 5:
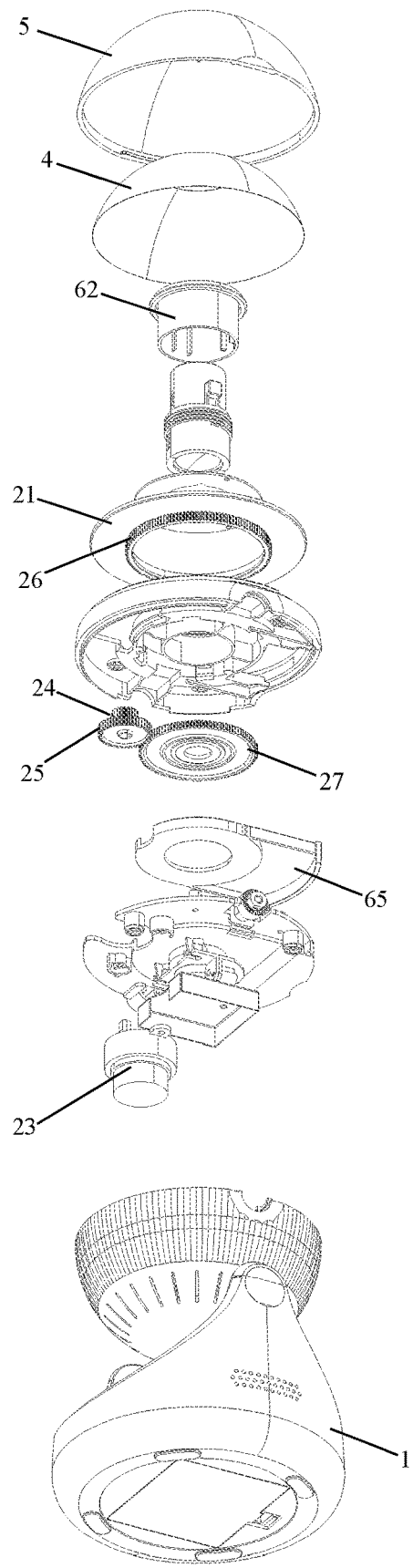
FIG. 5 schematically shows the exploded projection lamp in FIG. 4 from another perspective.
Figure 6:
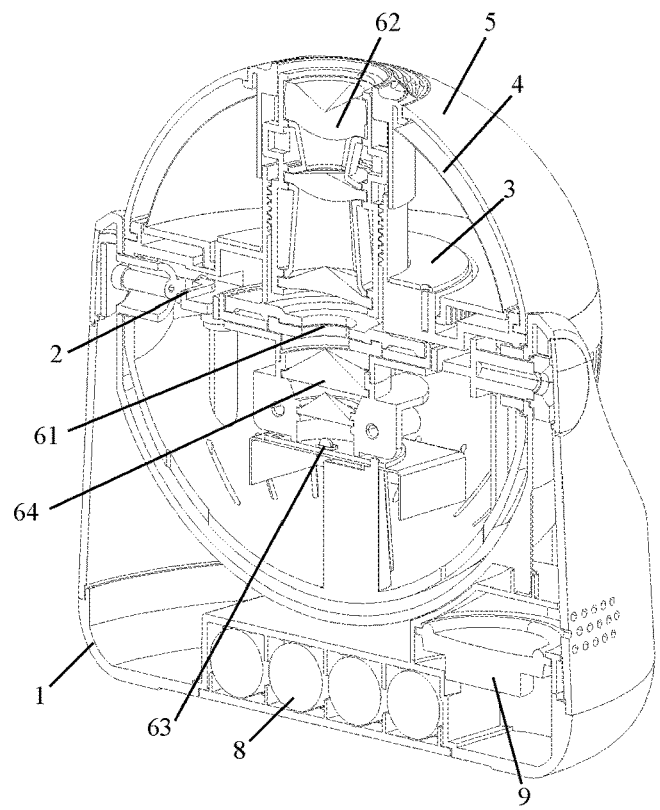
FIG. 6 is a sectional view of the projection lamp along A-A line in FIG. 1.
Figure 7:
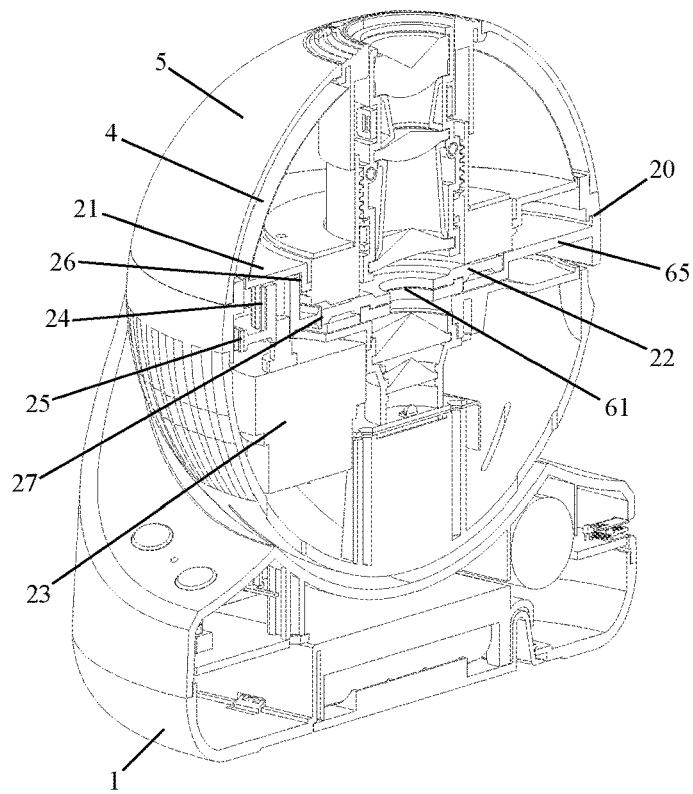
FIG. 7 is a sectional view of the projection lamp along B-B line in FIG. 1.

The disclosure will be further described below in detail with reference to the accompanying drawings and embodiments.

Embodiment 1

As shown in FIGS. 1-7, a projection lamp with a dual projection function is provided, which includes a bracket 1, a base 2, a first light-emitting element 3, a first projection film 4, a slide projection unit, a translucent cover 5, a battery 8 and a sound box 9.

The first light-emitting element 3, the first projection film 4 and the translucent cover 5 are arranged above the base 2. The first projection film 4 is arranged on an outside of the first light-emitting element 3, and covers the first light-emitting element 3. The transparent cover 5 is arranged on an outside of the first projection film 4. Light emitted from the first light-emitting element 3 can pass through the first projection film 4 to be projected outward to the translucent cover 5. When the translucent cover 5 is removed, the emitted light of the first light-emitting element 3 can pass through the first projection film 4 to be projected onto a wall or a ceiling. In this embodiment, the translucent cover 5 is detachably arranged on the outside of the first projection film 4. In other embodiments, an opaque cover, a transparent cover or a hollow cover with hollow patterns can also be detachably provided on the outside of the first projection film 4.

The base 2 is further provided with the slide projection unit. The slide projection unit includes a light-emitting assembly, a second projection film 61 and a focusing device 62. The light-emitting assembly includes a second light-emitting element 63 and a lens set 64 arranged between the second light-emitting element 63 and the second projection film 61. The lens set 64 includes at least one lens. Light emitted from the second light-emitting element 63 is refracted by the lens set 64 to form parallel light to irradiate on the second projection film 61, and then passes through the focusing device 62 to be projected outward. The projected light can be adjusted by the focusing device 62 to adjust a pattern projected on the wall or the ceiling.

In this embodiment, the first projection film 4 and the translucent cover 5 have an approximately hemispherical structure. A middle portion of the first projection film 4 is provided with a first through hole 41. A middle portion of the translucent cover 5 is provided with a second through hole 51. The first through hole 41 and the second through hole 51 are coaxial. A light path channel is formed between the second light-emitting element 63, the first through hole 41, and the second through hole 51. The lens set 64 and the focusing device 62 are arranged on the light path channel. Emitted light of the light-emitting assembly is projected outward through the first through hole 41 and the second through hole 51. A top of the focusing device 62 is provided with a rotating part 621 which protrudes from the outer side of the translucent cover 5 to facilitate the operation.

The base 2 is also provided with a driving assembly configured to drive the first projection film 4 and the second projection film 61 to rotate. The first projection film 4 is arranged on a first film mounting seat 21, and the second projection film 61 is arranged on a second film mounting seat 22. The driving assembly includes a first motor 23. A power output end of the first motor 23 is connected to the first film mounting seat 21 and the second film mounting seat 22 through a transmission mechanism. In this embodiment, the transmission mechanism includes a first driving gear 24 and a second driving gear 25. The first driving gear 24 and the second driving gear 25 are arranged on the power output end of the first motor 23. The first film mounting seat 21 is provided with a first driven gear 26 engaged with the first driving gear 24. The second film mounting seat 22 is provided with a second driven gear 27 engaged with the second driving gear 25. The first motor 23 can simultaneously drive the first projection film 4 and the second projection film 61 to rotate. In this embodiment, the second driven gear 27 has a toothed-disk structure. The second film mounting seat 22 is arranged at the center of the second driven gear 27.

In this embodiment, the second film mounting seat 22 is arranged on an insertion plate 65. The insertion plate 65 is detachably inserted into a slot 20 on the base 2. When the projection film 61 needs to be replaced, the insertion plate 65 can be pulled out of the slot 20 to replace the second projection film 61. The insertion plate 65 is provided with a mounting groove 650 configured to mount the second film mounting seat 22. A notch 651 is provided at an edge of the mounting groove 650 such that an edge of the second driven gear 27 protrudes from the mounting groove 650. After the insertion plate 65 is inserted into the slot 20, the edge of the second driven gear 27 protruding from the mounting groove 650 can be engaged with the second driving gear 25.

The base 2 is rotatably arranged on the bracket 1 to adjust a projection angle of the slide projection unit. A battery 8 and a sound box 9 can be arranged in the bracket 1.

Embodiment 2

Figure 8:
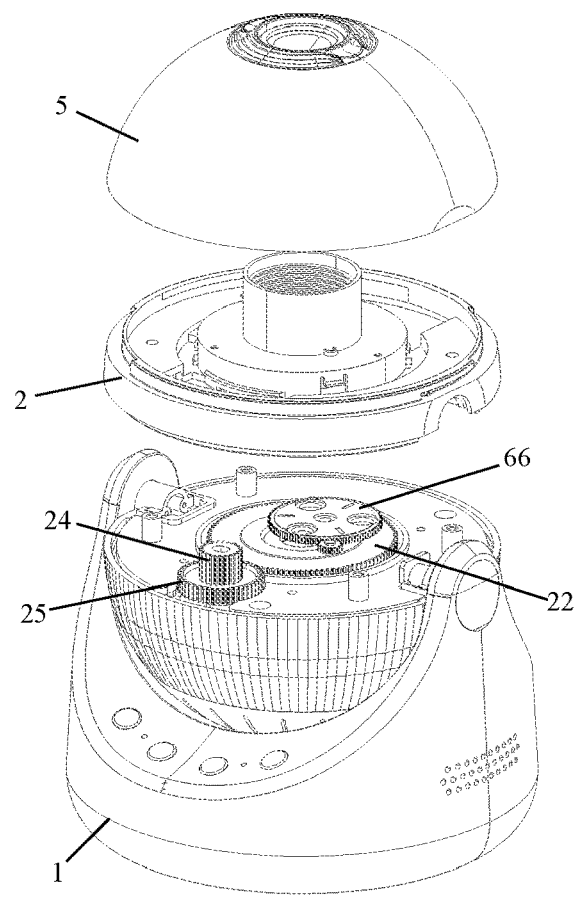
FIG. 8 is an exploded view of the projection lamp in Embodiment 2 of this disclosure.
Figure 9:
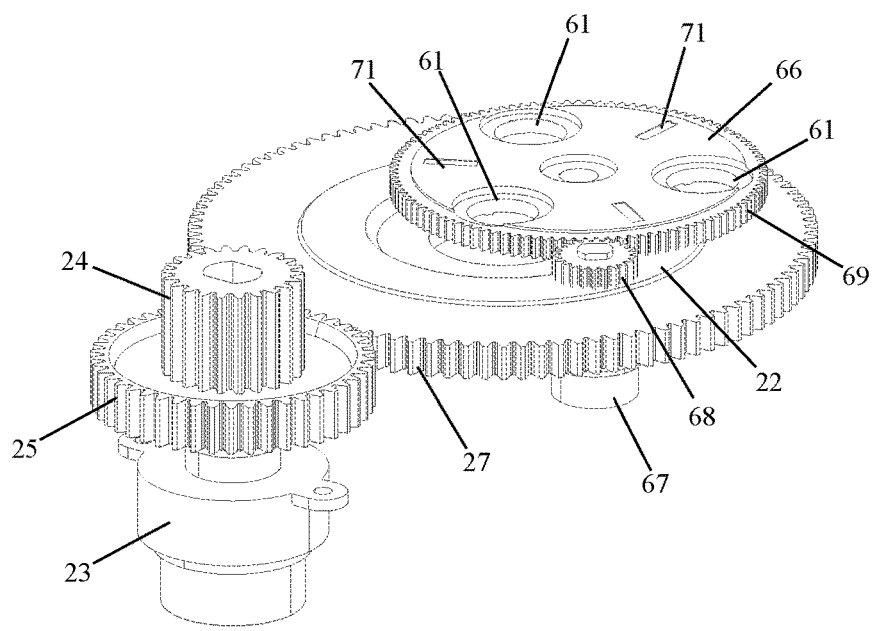
FIG. 9 is a structural diagram of a driving assembly in Embodiment 2 of this disclosure.

Referring to an embodiment shown in FIGS. 8-9, the slide projection unit includes a plurality of second projection films 61 and a film replacing device. The film replacing device is configured to replace the second projection film 61 arranged on a projection station. Specifically, the second projection films 61 are arranged on a film pallet 66. The film replacing device includes a second motor 67. A power output end of the second motor 67 is provided with a third driving gear 68. The film pallet 66 is provided with a third driven gear 69 engaged with the third driving gear 68. The second motor 67 can drive the film pallet 66 to rotate such that the second projection films 61 can be moved to the projection station in sequence to achieve the switch of the second projection film 61.

The slide projection unit further includes a film recognition device configured to recognize the second projection film 61 at the projection station. The projection lamp further includes a sound playing unit configured to play the sound corresponding to the second projection film 61 at the projection station.

In this embodiment, the film recognition device includes a sensing unit and a plurality of labels 71 arranged on the film pallet 66. The plurality of labels 71 are in one-to-one correspondence to the plurality of second projection films 61. When one of the plurality of second projection films 61 moves to the projection station, the corresponding label 71 moves relatively to a position opposite to the sensing unit. The labels 71 can be two-dimensional codes, and the sensing unit can be a camera or a code scanner. In other embodiments, the plurality of labels 71 and the sensing unit can also be other electromagnetic sensing devices, such as a radio frequency identification device of an RFID card.

The first projection film 4 is arranged on the first film mounting seat 21. The film pallet 66 is arranged on the second film mounting seat 22. The driving assembly includes the first motor 23. A power output end of the first motor 23 is connected to the first film mounting seat 21 and the second film mounting seat 22 through a transmission mechanism to drive the first projection film 4 and the second projection film 61 to rotate simultaneously.

Through the above technical solutions, in the projection lamp of the present disclosure, the emitted light of the first light-emitting 3 passes through the first projection film 4 to be projected outward to form a projection pattern corresponding to the first projection film 4. At the same time, the emitted light of the light-emitting assembly passes through the second projection film 61 to form the projection of the slide. In this way, the projection lamp of the present disclosure simultaneously has an ordinary function and a slide projection function. In addition, a focusing device is provided to adjust the projection pattern of the slide, or a plurality of second projection films 61 are provided to switch the pattern projected by the slide. At the same time, a film recognition device and a sound playing unit can also be provided to play music, song or other sounds, rendering the projection lamp of the present disclosure more enjoyable and entertaining.

It is apparent that the above-mentioned embodiments are merely for clear description, and are not intended to limit the disclosure. It should be understood that any changes, replacements and modifications made by those skilled in the art without departing from the spirit of the disclosure should fall within the scope of the disclosure defined by the appended claims.

What is claimed is:

1. A projection lamp with a dual projection function, comprising:
   a base;
   wherein the base is provided with a first light-emitting element and a first projection film; light emitted from the first light-emitting element is configured to pass through the first projection film to be projected outward; the base is provided with a slide projection unit; the slide projection unit comprises a light-emitting assembly and a second projection film; and light emitted from the light-emitting assembly is configured to pass through the second projection film to be projected outward;
   the base is provided with a driving assembly configured to drive the first projection film and/or the second projection film to rotate; and
   the first projection film is arranged on a first film mounting seat; the second projection film is arranged on a second film mounting seat; the driving assembly comprises a motor; and a power output end of the motor is connected to the first film mounting seat and/or the second film mounting seat through a transmission mechanism.

2. A projection lamp with a dual projection function, comprising:
   a base:
   wherein the base is provided with a first light-emitting element and a first projection film; light emitted from the first light-emitting element is configured to pass through the first projection film to be projected outward; the base is provided with a slide projection unit; the slide projection unit comprises a light-emitting assembly and a second projection film; and light emitted from the light-emitting assembly is configured to pass through the second projection film to be projected outward; and
   the second projection film is arranged on an insertion plate; and the insertion plate is detachably inserted into a slot on the base.

3. The projection lamp of claim 2, wherein the second projection film is arranged on a film mounting seat; the film mounting seat is arranged on the insertion plate and is configured to be inserted into the slot and pulled out of the slot together with the insertion plate; and the base is further provided with a motor; and
   the motor is connected to the film mounting seat through a transmission mechanism.

4. The projection lamp of claim 3, wherein the film mounting seat is provided with a driven gear; a driving gear is arranged on a power output end of the motor; the insertion plate is provided with a mounting groove; a notch is provided at an edge of the mounting groove; and after the insertion plate is inserted into the slot, an edge of the driven gear protruding from the mounting groove is engaged with the driving gear.

5. The projection lamp of claim 2, wherein the light-emitting assembly comprises a second light-emitting element and a lens set arranged between the second light-emitting element and the second projection film.

6. The projection lamp of claim 2, wherein the slide projection unit further comprises a focusing device arranged on an outside of the second projection film.

7. The projection lamp of claim 2, wherein a translucent cover, an opaque cover, a transparent cover or a hollow cover is provided at an outside of the first projection film.

8. The projection lamp of claim 7, wherein the first projection film is provided with a first through hole; the translucent cover is provided with a second through hole; the first through hole and the second through hole are coaxial; and the light emitted from the light-emitting assembly is configured to pass through the first through hole and the second through hole to be projected outward.

9. The projection lamp of claim 2, wherein the base is arranged on a bracket, and the base is configured to be rotatable to adjust a projection angle of the slide projection unit.

10. A projection lamp with a dual projection function, comprising:
   a base:
   wherein the base is provided with a first light-emitting element and a first projection film; light emitted from the first light-emitting element is configured to pass through the first projection film to be projected outward; the base is provided with a slide projection unit; the slide projection unit comprises a light-emitting assembly and a second projection film; and light emitted from the light-emitting assembly is configured to pass through the second projection film to be projected outward; and
   the second projection film comprises a plurality of second projection films; the slide projection unit further comprises a film replacing device; and the film replacing device is configured to replace one of the plurality of second projection films on a projection station with another of the plurality of second projection films.

11. The projection lamp of claim 10, wherein the plurality of second projection films are arranged on a film pallet; the film replacing device comprises a first motor; and the first motor is configured to drive the film pallet to rotate to allow the plurality of second projection films to move to the projection station in sequence.

12. The projection lamp of claim 11, wherein the slide projection unit further comprises a film recognition device configured to recognize one of the plurality of second projection films at the projection station; and the projection lamp further comprises a sound playing unit configured to play a sound corresponding to one of the plurality of second projection films at the projection station.

13. The projection lamp of claim 12, wherein the film recognition device comprises a sensing unit and a plurality of labels; the plurality of labels are in one-to-one correspondence to the plurality of second projection films; and when one of the plurality of second projection films moves to the projection station, a label of the plurality of labels corresponding to the second projection film on the projection station relatively moves to a position opposite to the sensing unit.

14. The projection lamp of claim 11, wherein the first projection film is arranged on a first film mounting seat; the second projection film is arranged on a second film mounting seat; the film pallet is arranged on the second film mounting seat; the base is provided with a driving assembly; the driving assembly comprises a second motor; and a power output end of the second motor is connected to the first film mounting seat and the second film mounting seat through a transmission mechanism.

* * * * *